US010990251B1

(12) United States Patent
Grail et al.

(10) Patent No.: US 10,990,251 B1
(45) Date of Patent: Apr. 27, 2021

(54) SMART AUGMENTED REALITY SELECTOR

(71) Applicant: SAP SE, Walldorf (DE)

(72) Inventors: Christian Grail, Zuzenhausen (DE); Gisbert Loff, Hockenheim (DE); Guido Wagner, Rauenberg (DE); Ingo Rues, Wiesloch (DE); Hanswerner Dreissigacker, Ludwigshafen (DE); Malin Wittkopf, Schwetzingen (DE); Johanna Wittig, Darmstadt (DE); Denise Nepraunig, Walldorf (DE); Joachim Fiess, Karlsruhe (DE); Manfred Johann Pauli, Bad Schönborn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/678,495

(22) Filed: Nov. 8, 2019

(51) Int. Cl.
*G06F 3/0481* (2013.01)
*G06F 3/0484* (2013.01)

(52) U.S. Cl.
CPC .......... *G06F 3/0484* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| 2004/0141003 | A1* | 7/2004 | Nivers | G06Q 30/02 |
| | | | | 715/745 |
| 2008/0278455 | A1* | 11/2008 | Atkins | G06F 3/0488 |
| | | | | 345/173 |
| 2010/0013780 | A1* | 1/2010 | Ikeda | G06F 3/04883 |
| | | | | 345/173 |
| 2011/0166953 | A1* | 7/2011 | Boncha | G06Q 30/02 |
| | | | | 705/26.4 |
| 2012/0105473 | A1* | 5/2012 | Bar-Zeev | G06T 7/70 |
| | | | | 345/633 |
| 2012/0143361 | A1* | 6/2012 | Kurabayashi | H04R 5/04 |
| | | | | 700/94 |
| 2013/0002578 | A1* | 1/2013 | Ito | G06F 3/0488 |
| | | | | 345/173 |

(Continued)

*Primary Examiner* — Phenuel S Salomon
(74) *Attorney, Agent, or Firm* — Sterne, Kessler, Goldstein & Fox P.L.L.C.

(57) ABSTRACT

Disclosed herein are system, method, and computer program product embodiments for determining an object of interest in an augmented reality environment, displaying an augmented reality selector containing pertinent actions in a reachable area, and causing a selected action to be executed. The augmented reality application may determine an augmented reality object of interest in an augmented reality experience and determine a reachable area of screen from the determined object to a reachable area. The augmented reality application may then display an augmented reality selector in the reachable area that includes interaction options determined based on the augmented reality object being focused on. In a mobile embodiment, this enhancement allows users to interact with the object without repositioning their hands or losing site of the object in the augmented reality experience. For an AR headset, by displaying the augmented reality selector in a reachable area, a user's field of vision remains unimpeded, and the user may interact with the object via simple gestures such as clicks.

18 Claims, 14 Drawing Sheets

(56) References Cited

U.S. PATENT DOCUMENTS

| | | | |
|---|---|---|---|
| 2013/0083003 A1* | 4/2013 | Perez | G06T 19/006 |
| | | | 345/419 |
| 2013/0147837 A1* | 6/2013 | Stroila | G06T 11/60 |
| | | | 345/633 |
| 2013/0155105 A1* | 6/2013 | Boldyrev | A63F 13/10 |
| | | | 345/633 |
| 2014/0063061 A1* | 3/2014 | Reitan | G09G 3/003 |
| | | | 345/633 |
| 2014/0222558 A1* | 8/2014 | Spivack | G02B 27/017 |
| | | | 705/14.51 |
| 2015/0070347 A1* | 3/2015 | Hofmann | G06T 19/006 |
| | | | 345/419 |
| 2017/0300205 A1* | 10/2017 | Villa | G06F 3/0484 |
| 2018/0268608 A1* | 9/2018 | Schneider | G06T 15/00 |
| 2018/0276895 A1* | 9/2018 | Hodge | G09G 5/003 |
| 2019/0102946 A1* | 4/2019 | Spivack | G06F 3/017 |
| 2019/0108578 A1* | 4/2019 | Spivack | G09G 5/14 |
| 2019/0188450 A1* | 6/2019 | Spivack | G06K 9/00369 |
| 2019/0260870 A1* | 8/2019 | Spivack | G06T 19/003 |
| 2019/0332400 A1* | 10/2019 | Spoor | G06F 9/453 |
| 2019/0333288 A1* | 10/2019 | Smet | G06T 19/20 |

* cited by examiner

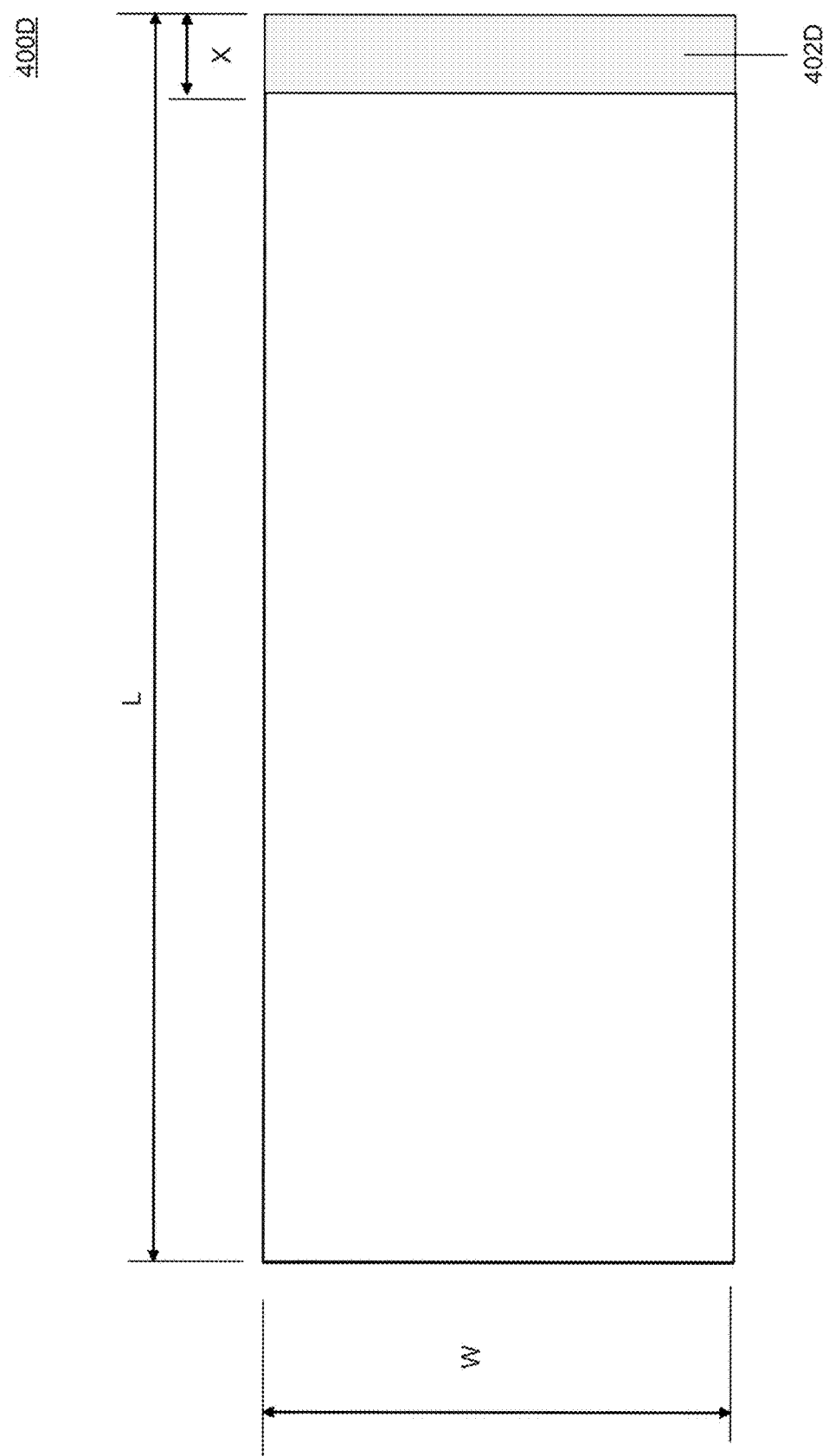

SMART AUGMENTED REALITY SELECTOR

BACKGROUND

Augmented reality systems provide users with an immersive user experience centered around augmented reality spaces. An augmented reality space may be a blended experience, with a physical, real-world environment enhanced with additional virtual perceptual information. An augmented reality system may provide an interaction methodology that allows users to interact with the augmented reality space and both virtual and real-world objects therein in a variety of fashions. Users may interact with the augmented reality space using an AR headset, AR glasses, or other suitable device devoted to interactions with an augmented reality space. Users may also interact with augmented reality spaces using a mobile device with an AR toolkit installed on it.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 4A-4F are example screen displays of a reachable area, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
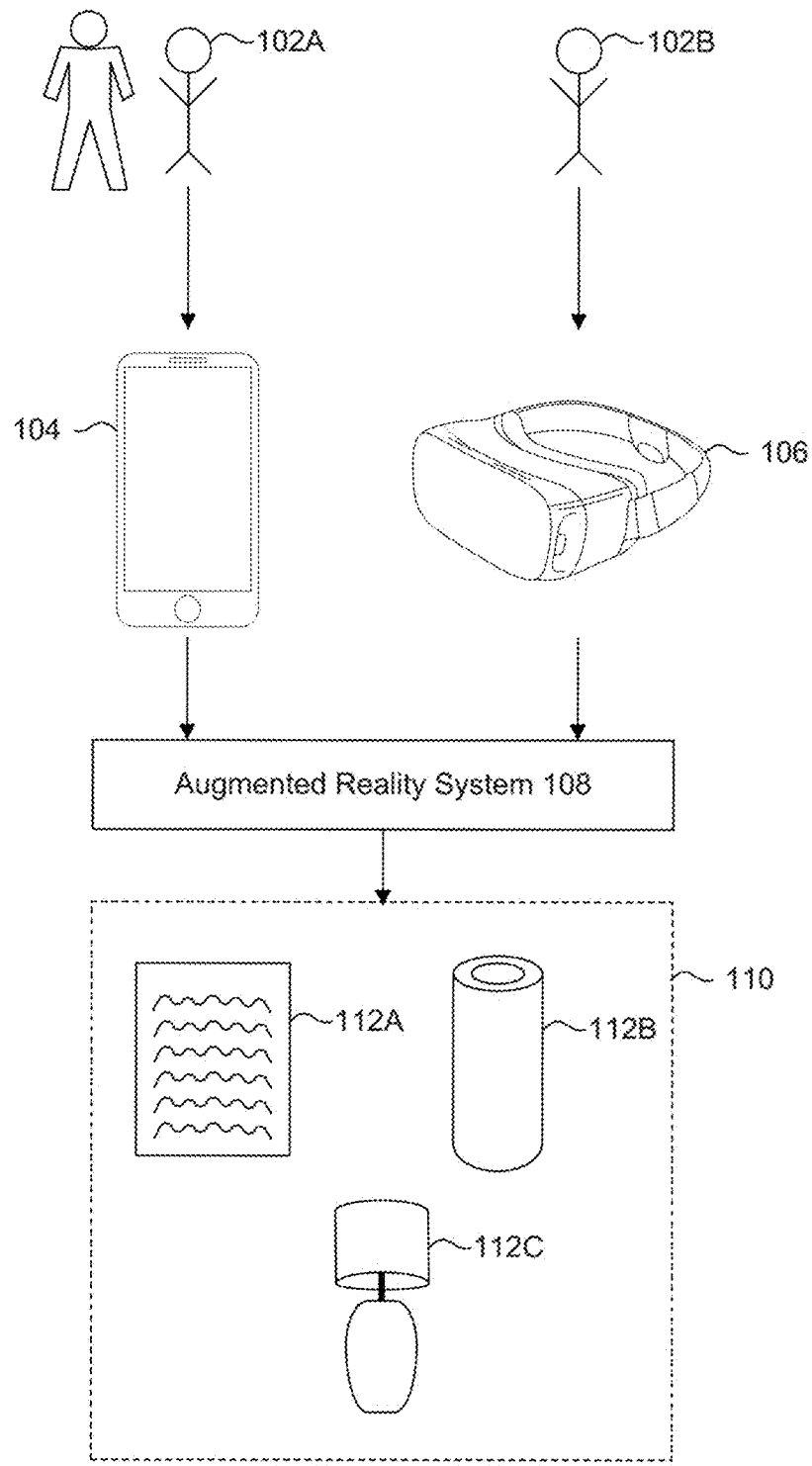
FIG. 1 is a block diagram of an augmented reality environment including an augmented reality system, according to some embodiments.

Provided herein are system, apparatus, device, method and/or computer program product embodiments, and/or combinations and sub-combinations thereof, for determining an object of interest in an augmented reality space, displaying a selector containing pertinent actions in a reachable area, and causing a selected action to be executed upon a subsequent user selection.

Augmented reality systems allow users to interact with real-world and virtual objects in an augmented reality space. An augmented reality system may present immersive sensations, e.g., sight, sound, smell, touch, etc. to users in a manner that blends tangible, real-world spaces and objects with computer-generated digital objects and data. Unlike a virtual reality system, which replaces a real-world environment with a simulated one, augmented reality systems may alter and enhance one's perception of a real-world environment. An augmented reality system may thus expand the interface through which users may interact with digital objects and bring data from the digital world into users' real-world perceptions. Compared to simply viewing a display screen, an augmented reality system presents a more immersive user-experience, as if incorporated data was a natural part of the physical, real-world environment.

In an augmented reality space, virtual elements, i.e., digital elements, may be a variety of computer-generated items including: data components, e.g., text files, tables, spreadsheets, and other documents, etc., multimedia files, e.g., videos, photos, sounds, games, books, etc., other suitable virtual objects, e.g., avatars, social-media feeds, news feeds, etc. Digital elements may also include informational components, e.g., text, numbers, metrics, and other suitable data. Digital elements may also include interface components provided by the augmented reality systems that drive interactions within the augmented reality space, e.g., menus, toolbars, and other navigation components.

Conversely, real-world objects in an augmented reality space may include the physical environment (e.g., the walls, floor, etc.) that a user presently inhabits and any tangible objects therein (e.g., a desk, a chair, a tree, etc.) Moreover, real-world objects may also be technological devices themselves, e.g., Internet-Of-Things (IoT) enabled devices, speakers, media devices, etc. These additional objects may provide further functions via various application programming interfaces (API) and other appropriate mechanisms of control, as described in further detail in the disclosure below.

Users may interact with an augmented reality system using an AR headset, AR glasses, or other device designed to render and display an augmented reality space and to facilitate interactions therewith. In an alternative embodiment, users may interact with an augmented reality space using a mobile device, e.g., a mobile phone, a tablet, etc., running an appropriate AR Toolkit or AR application. In such an embodiment, users may avoid the cost of procuring an AR headset, and the augmented reality system may tailor interaction methodologies to the mobile experience.

In an augmented reality space, a user may select an object to interact with. In one embodiment, when using a mobile device, a user may have to touch the position on the mobile device's screen where the object displays. By touching the object, the augmented reality experience may be alerted as to the particular object (virtual or real-world) that the user wants to interact with. When using an AR headset, a user may similarly differentiate between objects by pointing at the object, grabbing the object with a gesture, squeezing the object between two fingers, or using another suitable hand gesture interpretable by the AR headset. An augmented reality system may make further use of a clicking device, mouse, joystick, or other suitable input mechanisms in tandem with an AR headset.

Once a user selects an object, the user may perform various actions pertinent to the selected object. The nature of these actions may depend on the particular object selected. With virtual objects, for example, a user may scroll through a virtual document in the augmented reality space or engage in a variety of other three-dimensional interaction techniques with the document to view, edit, and otherwise interact with the information therein. With a physical object, a user may obtain more information about a selected object through a web search, queue a purchase order of the object, take a picture of the object, and perform other capabilities native to a mobile device or AR headset. Additionally, some physical objects may themselves include additional functionality that may be controlled within an augmented reality space. For example, a device such as a speaker may provide, via an API or other programmatic construct, various controls and functions to the mobile device, e.g., turn speaker on, raise/lower volume, etc. As noted above, a wide-array of actions may be performable and these actions may vary based on the selected object.

Legacy methods for object and action selection have proven frustrating to users. For example, it may be difficult for users to both hold a mobile device and select an object with their fingers, especially in the context of an augmented reality application, where the mobile device is also acting as a view-finder. Or a user may lose sight of the object in the augmented reality space while attempting to select it. The frustration for users may be especially apparent where the mobile device is a pad, tablet, or larger device where the distance to the center of the screen is substantial and a user cannot reach the object with their fingers while holding the mobile device. Other issues involve the size of the hands and fingers of the user relative to the size of the device such as a touch pad. Children with smaller hands may not be able to hold the device in both hands at the edges while simultaneously touching the center of a screen. Further issues can arise if the user is holding the device in one hand while holding something else in the other hand. In such situations, it may be difficult, if not impossible, to hold the device and interact with a touch control in the center, or on the opposite side of the device from the edge being held by the user. In other situations, the handedness of the user may not be taken into consideration. For example, a right-handed person may prefer to have controls located along the right-side of a touchscreen of a device vs. the left-side of the touchscreen. Additionally, in embodiments employing an AR-headset or AR-glasses, a user may not want to gesture wildly in the requisite fashions in all situations, e.g., if a user is wearing the AR-headset in a meeting.

Accordingly, a need exists to provide a better approach for determining an object of interest in an augmented reality environment, displaying an augmented reality selector containing pertinent actions in a reachable area, and causing a selected action to be executed upon a subsequent user selection. In addition to addressing the above, the embodiments of this disclosure provide a further technical improvement of reducing or even minimizing user interactions with the augmented reality environment thereby optimizing the performance of an augmented reality system. These embodiments provide another technical improvement by allowing users to complete the actions in a streamlined fashioned thereby reducing the number of calls and interactions that occur between the augmented reality environment and a controllable device. These embodiments provide another technical improvement by dynamically determining real-world and virtual objects within an augmented reality space thereby reducing the amount of storage needed to catalog this information.

FIG. 1 is a block diagram of an augmented reality environment 100 including an augmented reality system, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Augmented reality environment 100 may include users 102, mobile device 104, AR device 106, augmented reality system 108, location 110, and objects 112.

Users 102, such as user 102A and user 102B, may be individuals interacting with an augmented reality system. In one embodiment, user 102A may connect to an augmented reality system, described below as augmented reality system 108, using a mobile device, described below as mobile device 104. In another embodiment, user 102B may connect to augmented reality system 108 using an AR headset or other device, described below as AR device 106. Users 102 may connect to augmented reality system 108 using a suitable network such as the Internet, a local area network (LAN), a wide area network (WAN), a wireless network, a cellular network, or various other types of networks as would be appreciated by a person of ordinary skill in the art.

Mobile device 104 may be personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Mobile device 104 may provide a screen display via which users 102 may view an augmented reality space. Mobile device 104 may accept inputs from users 102 in the form of clicks, swipes, taps, and other appropriate input gestures. Mobile device 104 may further include additional software applications and functions that provide ancillary actions/options to perform once users 102 view and select an object in an augmented reality space, e.g., the ability to use a camera on mobile device 104, send messages and emails, make a phone call, perform searches, control internal audio/visual components, etc.

AR device 106 may be a specialty display device that allows users 102, such as user 102B, to view both real-world and virtual objects within an augmented reality space. AR device 106 may be wearable using other suitable head-mounted hardware, e.g., AR device 106 may be glasses or an augmented reality headset. In one merely exemplary use case, AR device 106 may be worn by user 102B while performing an activity, e.g., cycling, and AR device 106 may provide additional information in the digital display to user 102B such as speed, distance travelled, location coordinates, maps, etc. in another exemplary case, AR device 106 may be worn by user 102B while in the office, and user 102B may view the office and objects therein through AR device 106. The view may be enhanced with virtual representation of digital files, for example, spreadsheets, documents, databases, etc. Thus, user 102B may interact with digital files using AR device 106 using three-dimensional interaction techniques while still seeing and interacting with real-world objects and other people.

Augmented reality system 108 may present users 102 with an augmented reality space that includes both real-world and virtual objects. Augmented reality system 108 may include other sensory sensations in addition to sight, e.g., sound, smell, touch, etc. Thus, augmented reality system 108 may present a user interface via which users 102 may interact with virtual data and digital components overlaid onto the users' real-world perceptions. Augmented reality system 108 may also present navigation components, i.e., user-interface structures that accepts user inputs from users 102 and adjusts the augmented reality space appropriately. The components of augmented reality system 108 are described in further detail below with reference to FIG. 2.

Location 110 may be a space, room, environment, landscape, etc. that a user among users 102 presently inhibits. Location 110 may be an indoor space or an outdoor space. For example, location 110 may be a user's office or location 110 may be a road and the surrounding countryside as a user rides a bicycle. Any number of suitable real-world locations may serve as location 110 within the context of this disclosure, as will be understood by one skilled in the relevant art(s).

Objects 112, such as object 112A, object 112B, and object 112C, may be real-world items, articles, bodies, persons, animals, or other tangible objects as well as virtual elements such as data components, multimedia files, avatars, social-media feeds, news feeds, etc. displayed by augmented reality system 108. These examples provided in FIG. 1 within location 110 are merely exemplary and many suitable objects 112 may exist within the context of this disclosure.

For example, object 112A may be a file, document, spreadsheet, etc. Object 112A may be a virtual object inserted into an augmented reality space. However, object 112A may also be a real-world document written on paper that the user is viewing. If a virtual object, object 112A may be interacted with by users in a variety of fashions, e.g., a user may scroll through the document, edit the document, search within the document, etc. If a real-world document, object 112A may be interacted with by users in different fashions, for example, by taking a picture of the document, scanning and sending the document, creating a virtual document based on the real-world document, etc.

For example, object 112B may be a speaker or digital assistant. Object 112B may accept commands via an API, e.g., a command to raise or lower the volume of the speaker. Object 112C may be a lamp, which may receive commands via an API to turn on and off, dim the light, etc.

Figure 2:
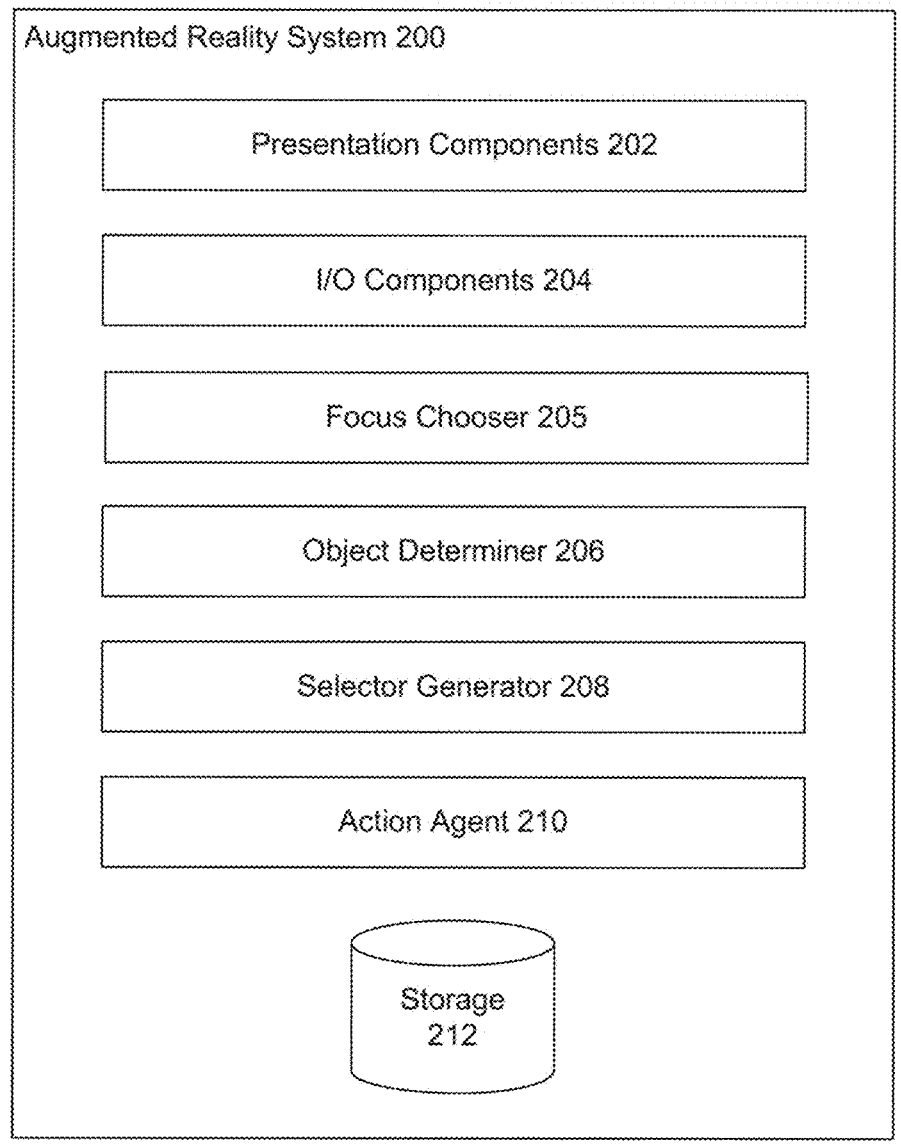
FIG. 2 is a block diagram of an augmented reality system, according to some embodiments.

FIG. 2 is a block diagram of an augmented reality system 200, according to some embodiments. Any operation herein may be performed by any type of structure in the diagram, such as a module or dedicated device, in hardware, software, or any combination thereof. Any block in the block diagram of FIG. 2 may be regarded as a module, apparatus, dedicated device, general-purpose processor, engine, state machine, application, functional element, or related technology capable of and configured to perform its corresponding operation(s) described herein. Augmented reality system 200 may include presentation components 202, I/O components 204, focus chooser 205, object determiner 206, selector generator 208, action agent 210, and storage 212.

Presentation components 202 may be employed by augmented reality system 200 to render an augmented reality space for user 102A on mobile device 104 and/or for user 102B on AR device 106. Presentation components 202 may facilitate dynamic interactions between users 102 and augmented reality spaces and objects rendered/existing in the augmented reality spaces. In an embodiment, presentation components 202 may provide visualization components to render the augmented reality space tailored for a mobile experience for user 102A on mobile device 104, e.g., the dimensions and navigation components for the augmented reality space may be designed specifically for users of mobile devices. In another embodiment, presentation components 202 may provide visualization components used by augmented reality system 200 to render the augmented reality space as viewed by user 102B using AR device 106, e.g., using three-dimensional graphical interfaces and interaction techniques.

I/O components 204 may be employed by augmented reality system 200 to receive inputs from users 102 as users 102 act within an augmented reality space. In an embodiment, I/O components 204 may receive inputs from users 102 that are entered on mobile device 104 such as taps, swipes, double taps, and other suitable inputs. In another embodiment, I/O components 204 may receive inputs entered via AR device 106, such as pointing, grabbing, clutching, waving, etc. I/O components 204 may further receive additional inputs from a clicker or mouse employed by users 102 in tandem with AR device 106.

Focus chooser 205 may determine a point of focus within a screen display. In an embodiment, focus chooser 205 may allow users 102 to determine a point of focus within the screen display by displaying an appropriate control in a reachable area. For example, focus chooser 205 may display a control on the edge of the screen display that when activated inserts a circle in the center of the touchscreen. Users 102 may move mobile device 104 or AR device 106 until the object falls within the circle, and then users may touch the control lying within the reachable area again. Focus chooser 205 may then select the indicated object from a plurality of objects. In an alternate embodiment, focus chooser 205 may automate the object of focus automatically, for example, by selecting the nearest object in the screen display, the most centrally located object in the screen display, the brightest object, or using another suitable programmatic approach. Focus chooser 205 may further store information about past-examined objects in storage 212. Focus chooser 205 may determine a point of focus based on these past examination, e.g., an object that user 102A previously interacted with may be prioritized over other objects in the screen display. Focus chooser 205 may receive further user input indicating that a first determined object of interest is undesired, in which case object determiner 206 may determine a second object of interest. In an embodiment, focus chooser 205 may determine multiple objects of interest within an augmented reality space, allowing a user to address multiple objects simultaneously.

Object determiner 206 may be employed by augmented reality system 200 to determine an object of interest based on a focus selection made by focus chooser 205. The object of interest may be a virtual or real-world object within an augmented reality space. Object determiner 206 may employ a variety of optical techniques to determine the nature and character of the object of interest. Object determiner 206 may employ a variety of optical recognition techniques, such as context analyzers and artificial intelligence object detection APIs, to determine the object of interest focused upon. Object determiner 206 may employ a text recognition engine to gather further information about written language on or around an object of interest. Object determiner 206 may determine the object of interest based on past determinations or user behaviors. In an embodiment, object determiner 206 may determine multiple objects of interest within an augmented reality space, allowing a user to address multiple objects simultaneously.

Selector generator 208 may be employed by augmented reality system 200 to generate a selector for display within the augmented reality space based on a determination as to the nature and character of an object of interest made by object determiner 206. Selector generator 208 may determine the available actions associated with the determined object of interest. For interest, if the object of interest is determined to be a speaker, then selector generator 208 may display a volume control option within a selector. However, if the object of interest is determined to be a radio, selector generator 208 may display a selector that allows users 102 to both control volume and tune to a different radio station. Selector generator 208 may harness presentation components 202 to render a line or other geometric shape from the object of interest to a reachable area of a screen display on mobile device 104 or in AR device 106. Selector generator 208 may further determine appropriate actions performable by/on/with/about an object of interest. Selector generator 208 may thus customize the displayed selector for the objects of interest.

Action agent 210 may be employed by augmented reality system 200 to complete actions selected by users 102 from a selector generated by selector generator 208. In an embodiment, action agent 210 may interact with mobile device 104 to cause actions to be executed on the mobile device. For example, a selector may be generated that includes an option to take a picture of an object of interest viewed by user 102A within an augmented reality space. In another embodiment, action agent 210 may interact with the object itself through an API, e.g., object 112B and object 112C. In this embodiment, action agent 210 may ascertain a format required for an effective API call to be sent to the object based on the action selected by user 102A. Action agent 210 may then form the API call and send the API call to the object via an appropriate protocol. In this embodiment, action agent 210 may facilitate user control of real-world devices from within the augmented reality space.

Storage 212 may be any of a panoply of data storage systems housing information relevant to, used in, and stored by augmented reality system 200. For instance, storage 212 may be a database management system or relational database tool. Storage 212 may further be a message queue or stream processing platform such as Apache Kafka or Apache Spark or other data storage systems like Apache Hadoop, RDFS, or Amazon S3, to name just some examples.

Figure 3A:
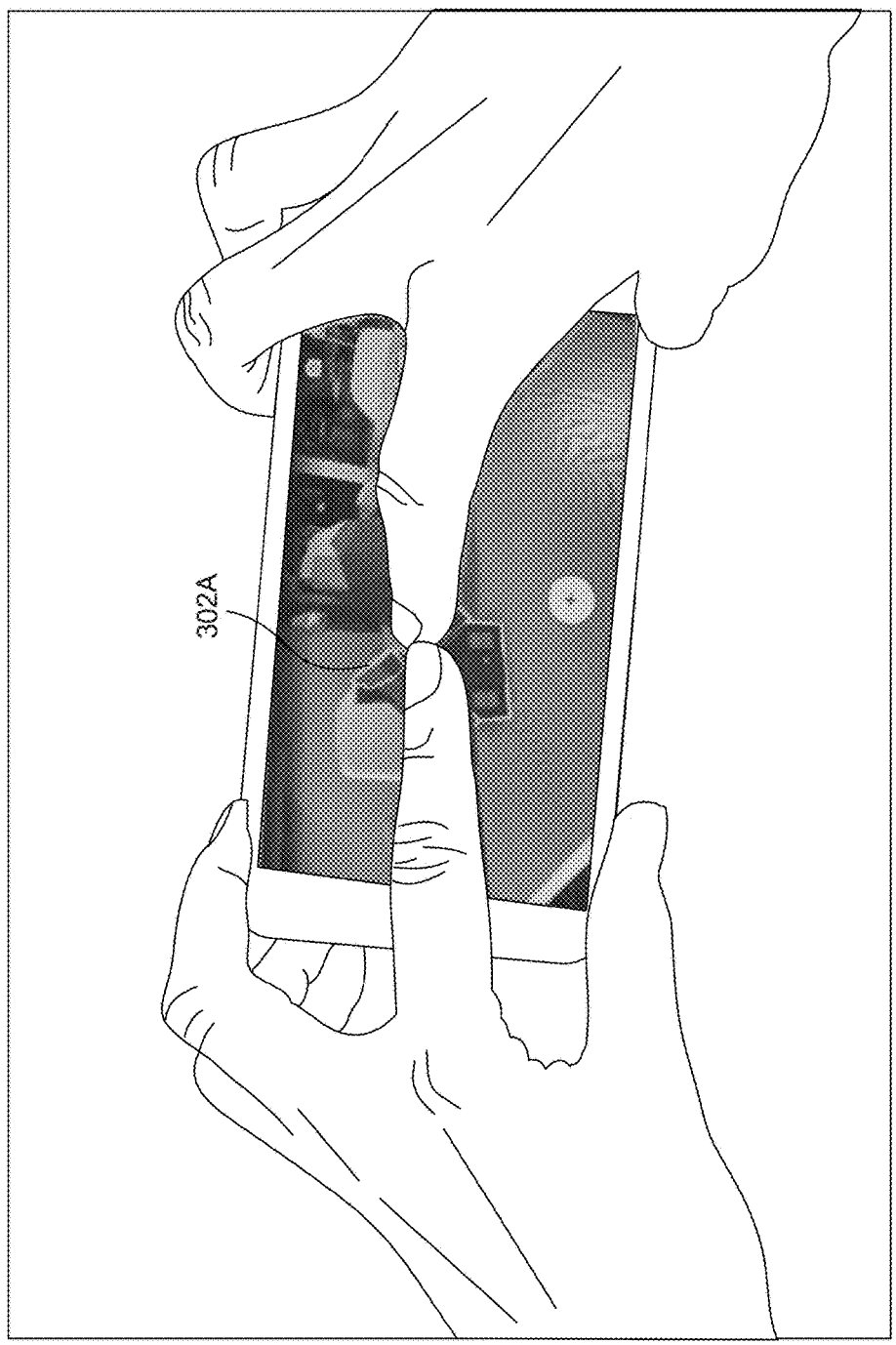
FIG. 3A is an example screen display of an augmented reality space displaying on a mobile device, according to some embodiments.

FIG. 3A is an example screen display 300A of an augmented reality space displaying on a mobile device, according to some embodiments. The screen display provided in FIG. 3A is merely exemplary, and one skilled in the relevant art(s) will appreciate that many approaches may be taken to provide a suitable screen display 300A in accordance with this disclosure. Exemplary screen display 300A includes object of interest 302A.

Screen display 300A illustrates a legacy method of interacting with an object in an augmented reality space. In this example, users 102 may indicate object of interest 302A by touching the object with their fingers. Here, object of interest 302A is a house, a virtual object inserted by augmented reality system 108 into an augmented reality space. As described, above, this legacy method of action determination may be frustrating to users 102. Users 102 may find it difficult to hold a mobile device and select an object with their fingers in the context of an augmented reality application. If mobile device 104 is a larger mobile device, users 102 may have an increased difficulty in selected an object while holding the device.

Figure 3B:
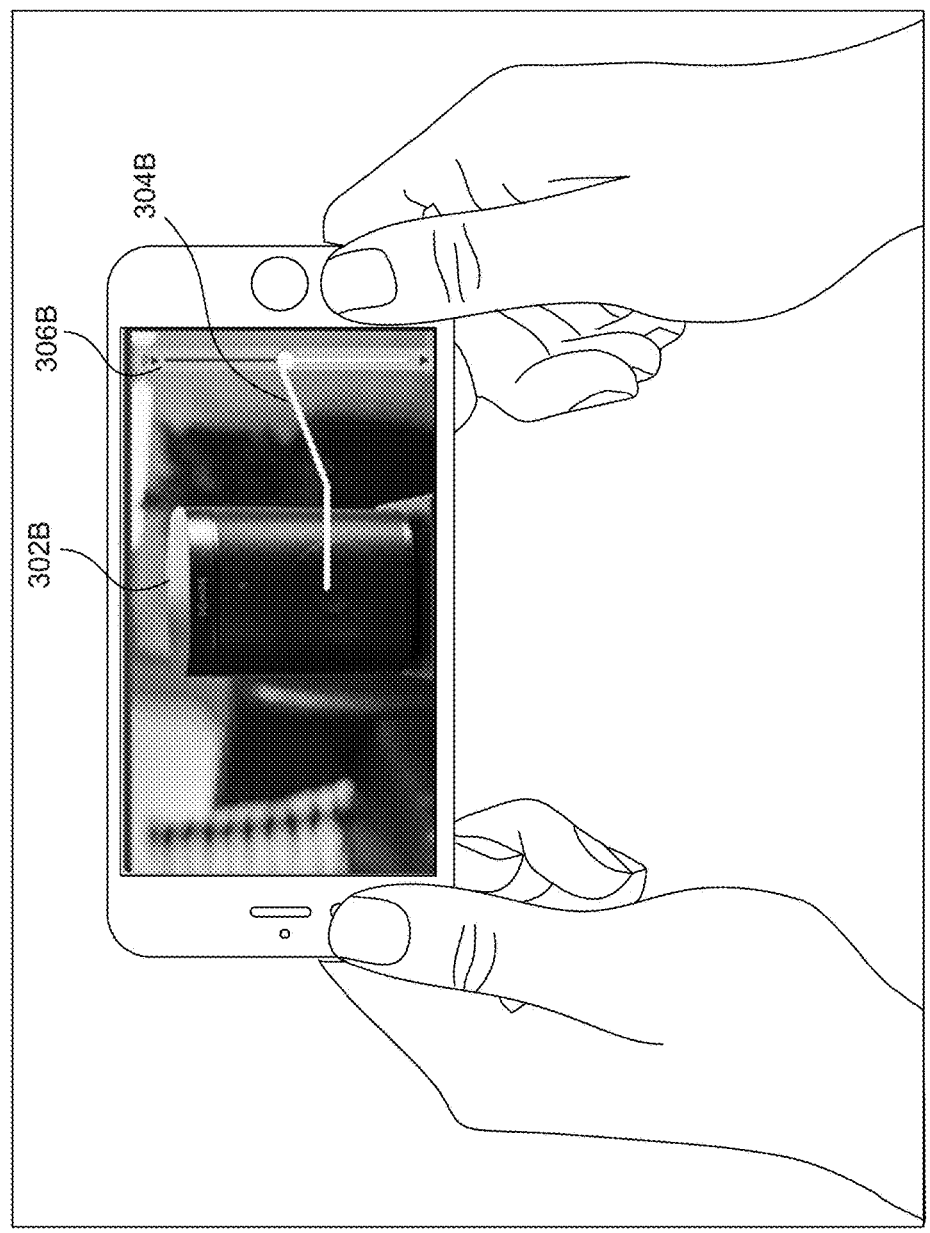
FIG. 3B is an example screen display of an augmented reality space displaying a determined object and an augmented reality selector, according to some embodiments.

FIG. 3B is an example screen display 300B of an augmented reality environment displaying a determined object and an augmented reality selector, according to some embodiments. The screen display provided in FIG. 3B is merely exemplary, and one skilled in the relevant art(s) will appreciate that many approaches may be taken to provide a suitable screen display 300B in accordance with this disclosure. Exemplary screen display 300B includes object of interest 302B, line 304B, and selector 306B.

Screen display 300B presents an example in which object of interest 302B is a speaker or other controllable device such as a digital assistant. In this example, screen display 300B includes line 304B rendered by presentation components 202. Line 304B travels from object of interest 302B to a reachable area of mobile device 104. The reachable area is more easily accessible to users holding mobile device 104 and/or does not impede the vision of users 102 on AR device 106. In the reachable area, augmented reality system 108 displays selector 306B rendered based on the actions that are available for the object. In this example, selector 306B is a volume control that allows users 102 to raise and lower the volume of the speaker. When users 102 raise or lower the volume via selector 306B, action agent 210 may form and send an appropriate API call to object of interest 302B to complete the action.

Figure 3C:
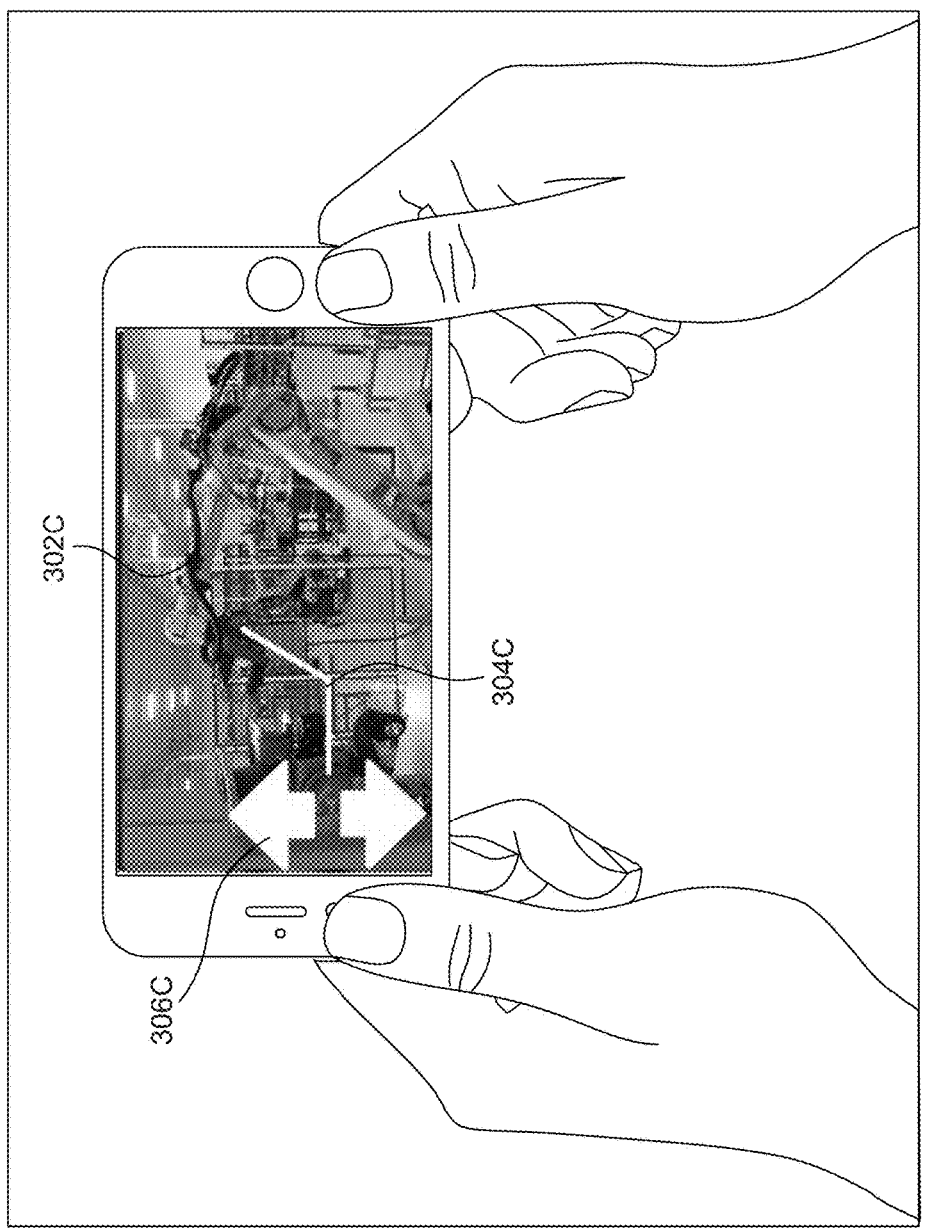
FIG. 3C is an example screen display of an augmented reality space displaying a controllable object and an augmented reality selector, according to some embodiments.

FIG. 3C is an example screen display 300C of an augmented reality environment displaying a controllable object and an augmented reality selector, according to some embodiments. The screen display provided in FIG. 3C is merely exemplary, and one skilled in the relevant art(s) will appreciate that many approaches may be taken to provide a suitable screen display 300C in accordance with this disclosure. Exemplary screen display 300C includes object of interest 302C, line 304C, and selector 306C.

Screen display 300C presents an example in which object of interest 302C is a controllable robot arm in a factory. In this example, screen display 300C also includes line 304C as rendered by presentation components 202. Line 304C travels from the identified object of interest 302C to a reachable area of mobile device 104. In the reachable area, augmented reality system 108 displays selector 306C rendered based on the actions that are available for the object. In this example, selector 306C allows users to move the robot arm up and down. When users 102 select to move the robot arm via selector 306C, action agent 210 may form and send an appropriate API call to object of interest 302C to complete the action.

FIGS. 4A-4F are example screen displays of a reachable area, according to some embodiments. FIGS. 4A-4F display reachable area 402.

Reachable area 402 may represent a portion of a screen display that is accessible to users 102 holding mobile device 104 and/or an area that does not impede the vision of users 102 using AR device 106. In an embodiment, as displayed in FIGS. 4A-4F, augmented reality environment 100 may calculate dimensions of X, Y and Z in relation to the width and length (displayed in FIGS. 4A-4F as W and L). In this embodiment, X, Y, and Z may be numerical values representing a percentage of the total length and width. In some embodiments, augmented reality environment 100 may store this information in a user program and allow users 102 to update this information in a user profile.

Figure 4A:
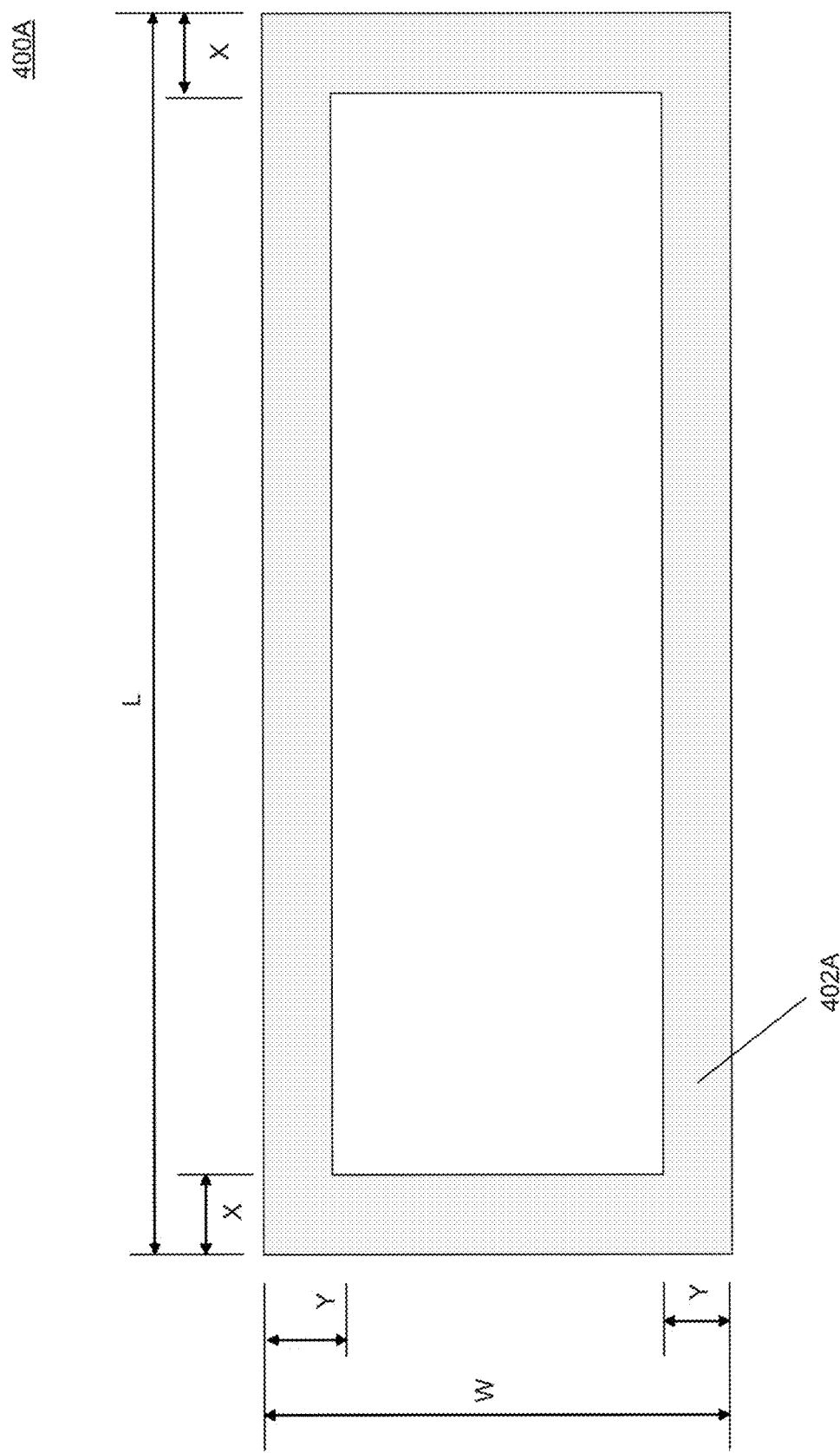
Figure 4B:
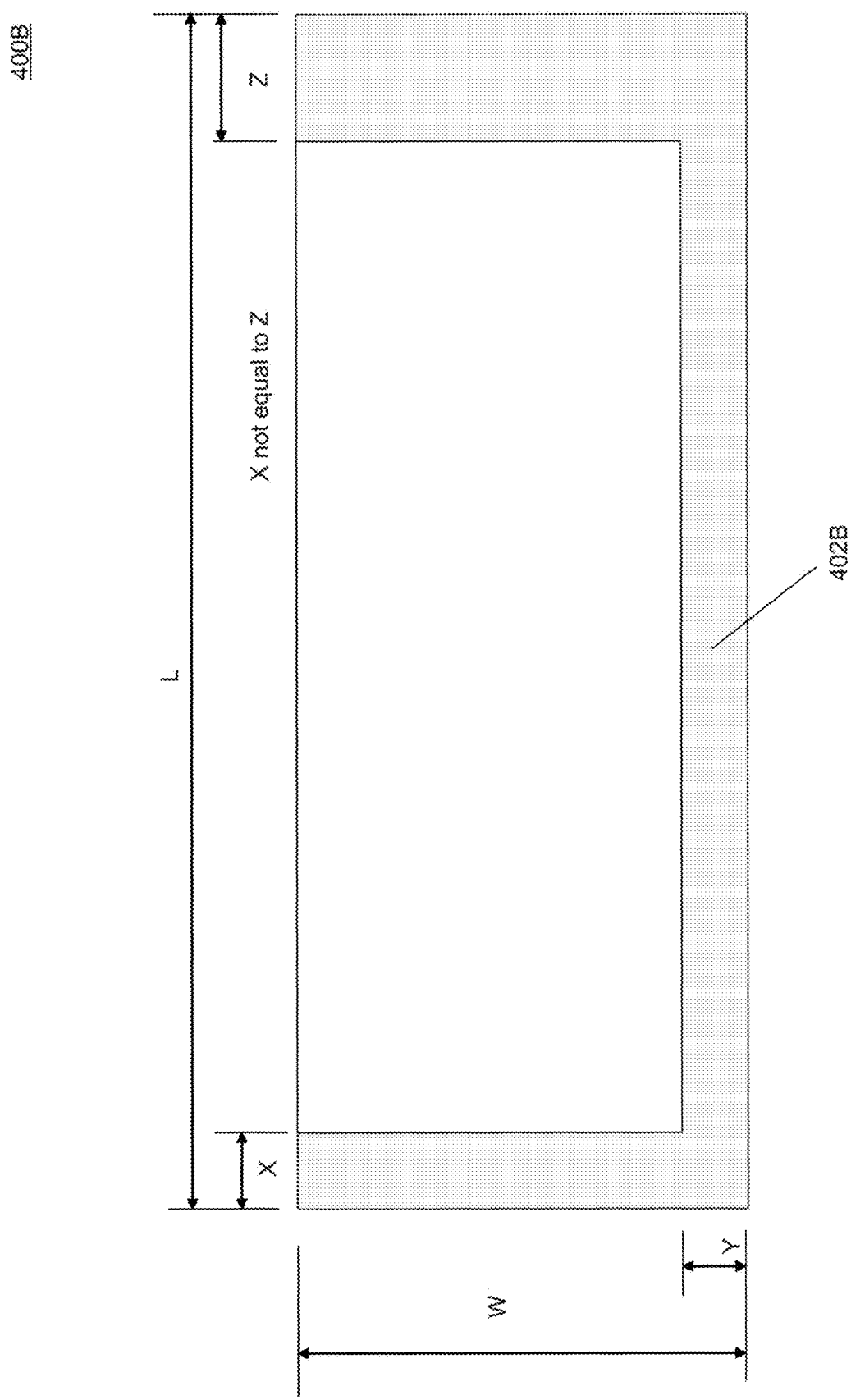
Figure 4C:
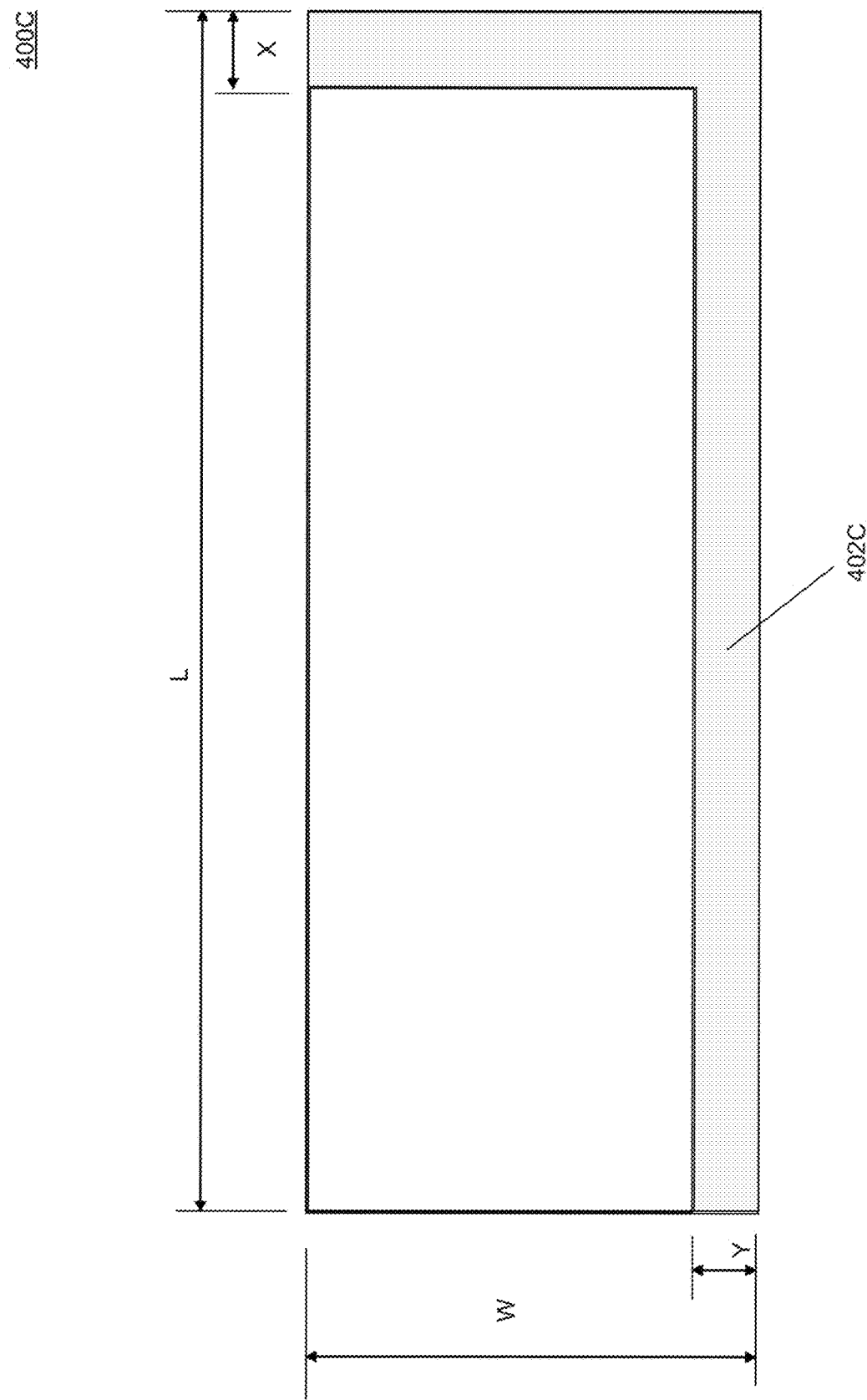
Figure 4E:
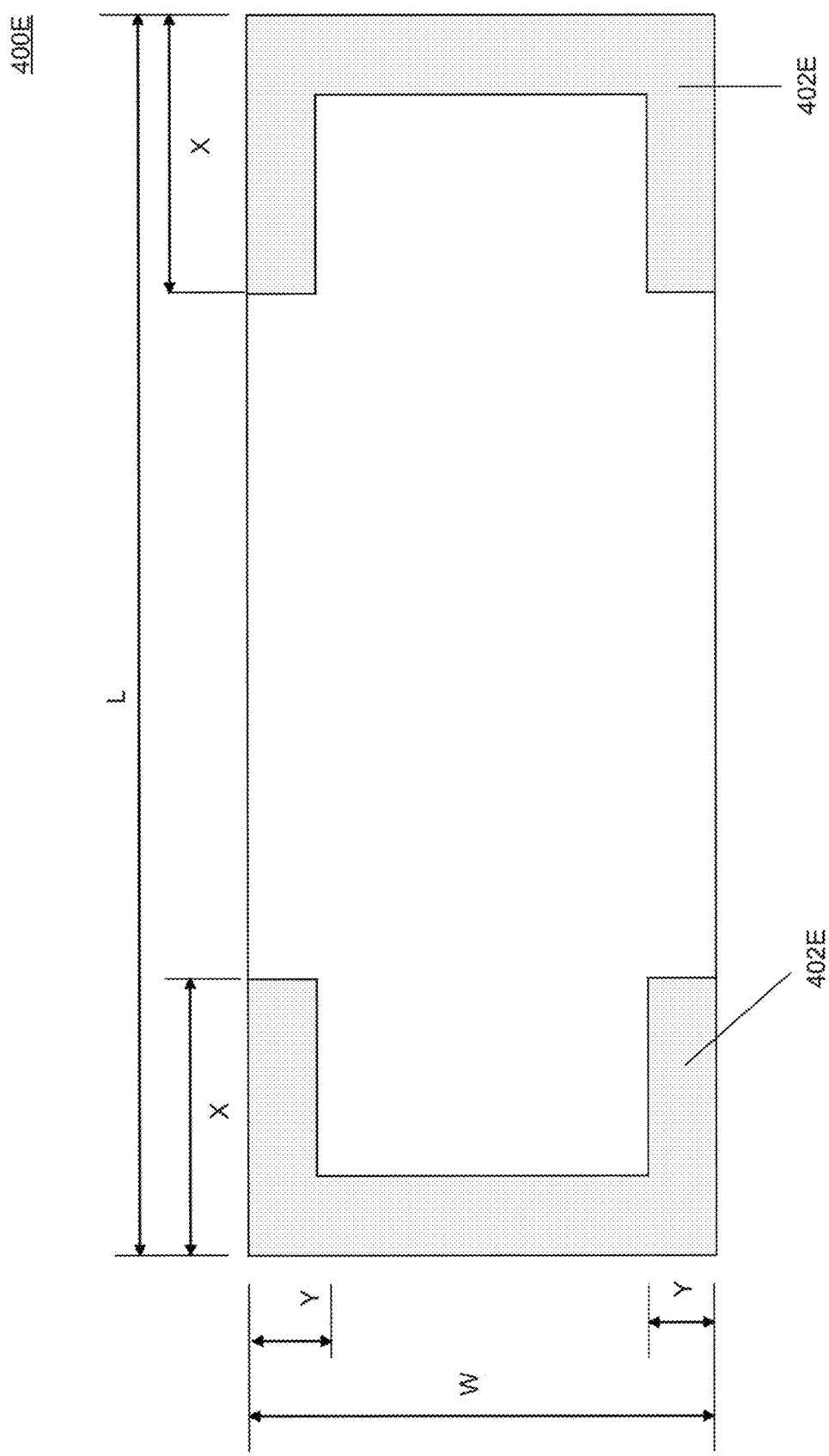
Figure 4F:
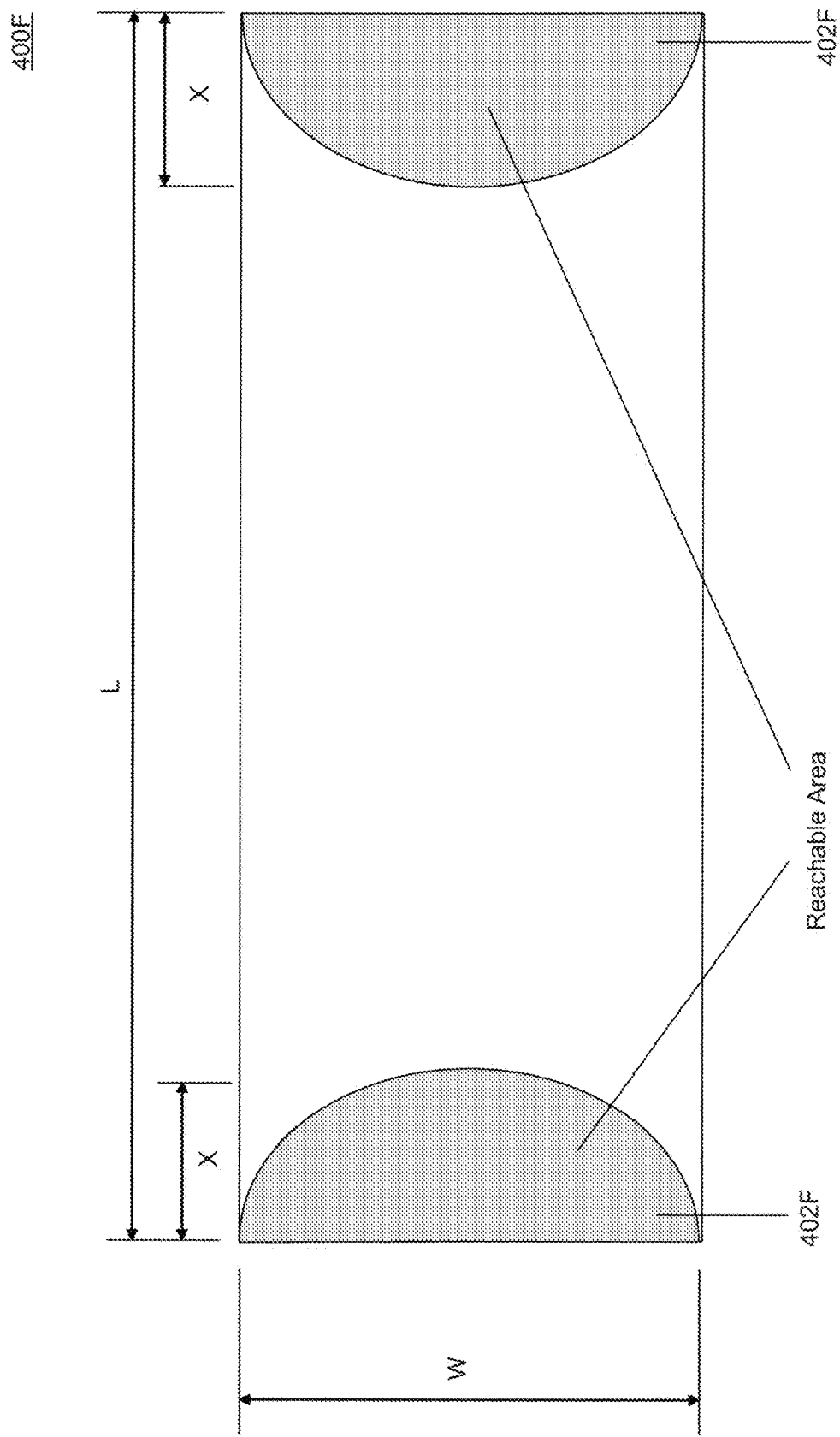

In FIG. 4A, reachable area 402A displays a rectangular region covering the circumference of a screen display. Here, for example, X and Y may be set to 5-percent of the screen display, and no value is set for Z. In FIG. 4B, the top of the screen display is not included in reachable area 402B based on appropriate settings. Here, for example, X and Y may be set to 5-percent of the screen display and the Z value may be set to 7-percent. In this embodiment, the Z-value may be used to set a heightened percentage for a tight-handed individual who is more likely to be able to reach the right side of the screen. In FIG. 4C, reachable area 402C may be configured to only display on the right side and bottom of the screen, again indicating that the particular user may be right-handed. In FIG. 4D, reachable area 402D may be configured to only display on the right side of the screen display. In FIG. 4E, reachable area 402E may be configured to omit the top and bottom portions of the screen. FIG. 4F indicates an exemplary display of reachable area 402F where reachable area 402F is a semi-circle in contrast to the previous examples in which the reachable area is rectangular. One skilled in the relevant art(s) will understand that these illustrated reachable areas are merely exemplary and that numerous other configurations may exist within the context of this disclosure.

In some embodiments, a given screen display may include multiple reachable areas and multiple selectors within those reachable areas. For example, in FIG. 4F, one selector 308 may be displayed in the right reachable area 402F and another selector 308 may display in the left reachable area 402F. For such an embodiment, object determiner 206 may determine multiple objects of interest and selector generator 208 may build multiple selectors for user interaction.

Figure 5:
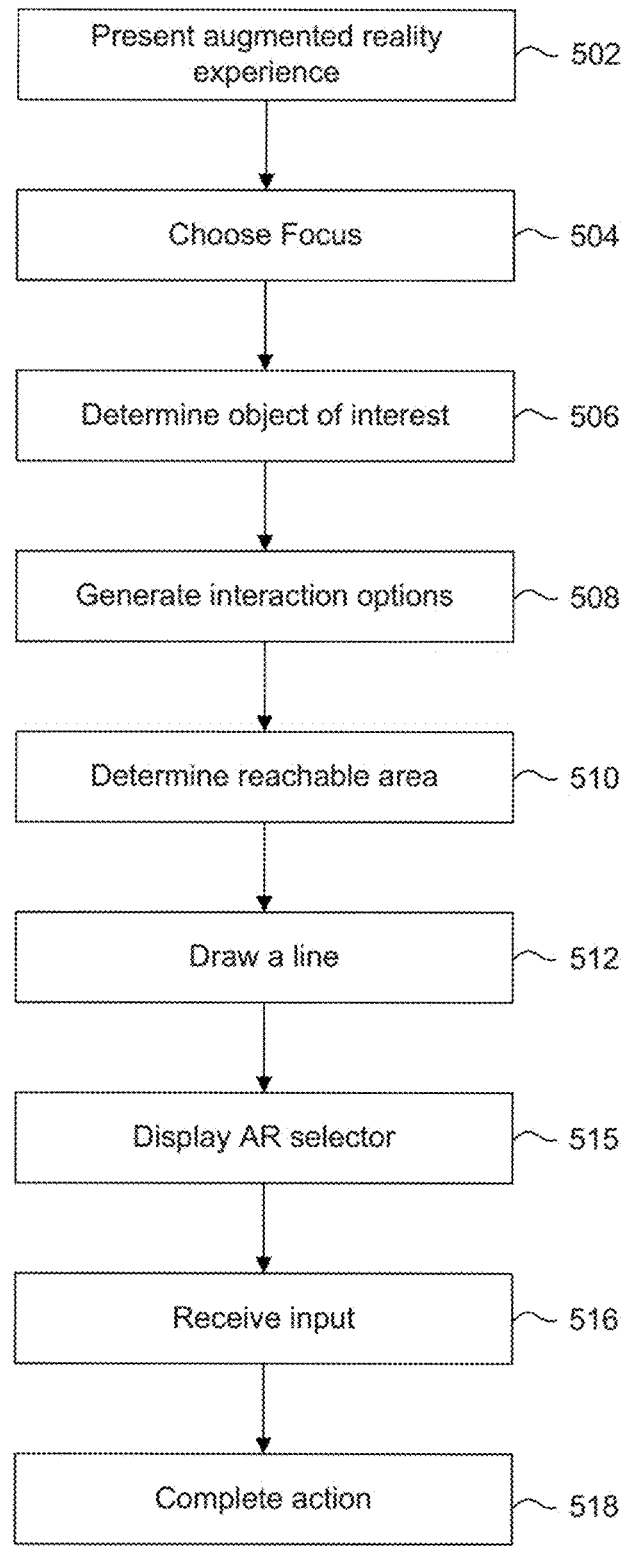
FIG. 5 is a flowchart illustrating a method of determining an object of interest and displaying an augmented reality selector with pertinent options, according to some embodiments.

FIG. 5 is a flowchart illustrating a method 500 of determining an object of interest and displaying an augmented reality selector containing options pertinent to the determined object of interest, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, augmented reality system 108 may employ presentation components 202 to present an augmented reality space to user 102. Augmented reality system 108 may generate virtual objects in the augmented reality space for users to view and interact with alongside real-world objects. In this fashion, augmented reality system 108 may present a fully interactive and immersive user-experience to users 102 that blends virtual objects and data with real world. Objects and environments. In one embodiment, user 102A may experience, i.e., view and interact with, augmented reality system 108 using mobile device 104. In another embodiment, user 102B may experience augmented reality system 108 using AR device 106. In one exemplary use case, user 102B may wear AR device 106 while working in their office. Augmented reality system 108 may allow user 102B to view the physical state of their office (e.g., the walls, the floor, the ceiling, etc.) and any real-world objects contained in the office (e.g., their desk, their chair, their computer, a speaker, etc.). That is to say, user 102B may view the real physical world that surrounds them. However, augmented reality system 108 may then render additional digital components in the augmented reality space. For example, augmented reality system 108 may display a digital representation of document worked on by the user, overlaid on real-world objects. Augmented reality system 108 may allow the user to edit the document, navigate the document, etc., and may employ three-dimensional interaction techniques facilitating these actions. Augmented reality system 108 may also overlay additional navigational components, e.g., a menu system, to allow the user to navigate the augmented reality space, load additional virtual objects, etc.

In 504, augmented reality system 108 may employ focus chooser 205 to choose a point of focus for users 102, i.e., the object being focused upon within a screen display. One skilled in the relevant art(s) will appreciate that in a given augmented reality space, many objects may exist, both real-world objects and virtual objects. Accordingly, focus chooser 205 may determine a point of focus including an object within a screen display to determine the object that a user most likely desires to interact with. In an embodiment, focus chooser 205 may determine the item being focused by the central position of the item in a screen display on mobile device 104. In another embodiment, focus chooser 205 may determine the object based on the object being in the center of viewing region in AR device 106. In addition to proximity to the center of a viewing region, focus chooser 205 may analyze other factors such as objects interacted with in the past by a particular user among users 102. In one embodiment, augmented reality system 108 may also receive additional user inputs in response to a first determined object, where the additional user inputs indicate that the user wishes to interact with a second determined object instead of the first determined object of interest. In another embodiment, augmented reality system 108 may receive another user input that indicates that the system should determine a second point of focus in addition to and simultaneously with the point of focus. In these embodiments, augmented reality system 108 may determine more than one object within an augmented reality space generated by augmented reality system 108.

In 506, augmented reality system 108 may employ object determiner 206 to the object of interest based on the point of focus chosen in 504. Object determiner 206 may determine the nature and character of the object or objects within the point of focus. Object determiner 206 may thus aid selector generator 208 in providing an appropriate selector tailored to the object of interest. For instance, object determiner 206 may examine the point of focus in a screen display and determine that the object of interest is a radio. Object determiner 206 may also determine additional capabilities of the object of interest, e.g., API availability within the object of interest. Object determiner 206 may employ a variety of optical recognition techniques, such as context analyzers and artificial intelligence object detection APIs, to determine the object of interest focused upon.

In 508, augmented reality system 108 may determine interaction options relevant to the object of interest determined in 506. In one embodiment, these interaction options may be actions performable by the determined object of interest. For some real-world objects, the performable actions may be limited to capabilities provided by/on mobile device 104 and/or AR device 106. For example, if user 102A examines a pen on a desk displayed in an augmented reality space, the performable actions may be limited to taking a picture of the pen, performing a search about pens, etc. For other real-world objects, performable actions may include identified capabilities of the device, such as the speaker and radio examples described above. In such an embodiment, the performable actions may be identified by querying the object using an API call to determine the options that are available on the device. When the object of interest is a virtual object, such as a document rendered for display by augmented reality system 108, the options may pertain to that specific virtual element and may be provided by augmented reality system 108 within an augmented reality space, e.g., moving the virtual object around the screen, deleting the virtual object, etc. For example, options may be displayed to remove the object from view, navigate the object in an appropriate fashion, edit the object, etc.

In 510, augmented reality system 108 may determine reachable area 402. In an embodiment, augmented reality system 108 may consider the orientation of mobile device 104, e.g., horizontal or vertical. As described above, reachable area 402 may be determined using Y, and Z dimensions in relation to the length and width of the screen and determine the reachable area based on these values. Augmented reality system 108 may then determine the reachable area based on this orientation. In an embodiment, the reachable area may be determined by augmented reality system 108 to be reachable by the fingers of user 102A using mobile device 104. For example, the reachable area may be closer to the edges of the screen display. In another embodiment, augmented reality system 108 may determine the reachable area to be outside of the center of the display of AR device 106, e.g., in a section of the display devoted to navigation components.

In 512, augmented reality system 108 may employ presentation components 202 to draw a line from the object of interest to the reachable area determined in 508. Although this disclosure refers to this as a line, other suitable geometric indicators may be employed, e.g., arrows, boxes, and other geometric shapes. Exemplary screen display 300B and screen display 300C display, described in further detail above, display line 304B and line 304C respectively, and indicate an illustrative example of the drawn line.

In 515, augmented reality system 108 may employ selector generator 208 to generate an appropriate augmented reality selector and display the selector in the reachable area using presentation components 202. The selector display may vary based on interaction options determined in 508. For example, if the object of interest is a speaker offering an API to control the volume, the selector may be a volume control as displayed above in exemplary screen display 300. For another example, if the object is a robot arm, then the selector may be a directional pad that allows a user to control the robot arm. These examples are merely illustrative, however, and numerous suitable selectors may be generated by selector generator 208 within the context of this disclosure.

In 516, augmented reality system 108 may employ I/O components 204 to receive an input in the selector generated in 514 from users 102. For example, users 102 may select to raise the volume when the identified object is a speaker, or move a robot arm up when the identified object is a robot arm. I/O components 204 may receive the selected user action via an appropriate user gesture. For a native command example, a user may select to take a picture of the object of interest. For a virtual object, a user may select to, for example, delete the virtual object from the augmented reality space. In one embodiment, user 102A may select the action on the displayed selector by tapping, swiping, double-tapping, etc. In another embodiment, user 102B may select the action through AR device 106 by gesturing appropriately. In this embodiment, user 102B may also use a clicker, a mouse, a joystick, or other input mechanism used in tandem with AR device 106. For example, user 102B may simply look in the direction of the selector and trigger a clicker held in the user's hand to indicate a selection.

In 518, augmented reality system 108 may employ action agent 210 to complete the selected action. In one embodiment, action agent 210 may interact with mobile device 104 to cause functions available on mobile device 104 to execute. For example, this may occur when the real-world object is static, such as a pen, and the available options are capabilities provided by mobile device 104, e.g., taking a picture of the pen. In another embodiment, action agent 210 may interact with the object through an application programming interface provided by the object. In this embodiment, action agent 210 may ascertain a format required for an effective API call to be sent to the object based on the action selected by user 102A. Action agent 210 may then form the API call and send the API call to the object via an appropriate protocol. In this embodiment, action agent 210 may facilitate user control of real-world devices from within the augmented reality space. For example, action agent 210 may form an appropriate API call to a speaker to raise the volume. If the object is a virtual object, then augmented reality system 108 may complete the action within the augmented reality space, e.g., by deleting the object, moving the object, navigating through the object in three-dimensions, etc.

In the foregoing fashion, augmented reality system 108 may determine for users 102 viewing an augmented reality space an object of interest without requiring the user to select the object of interest with a particularized input gesture. Moreover, augmented reality system 108 may display a selector containing pertinent actions in a reachable area for easy access by users 102. Augmented reality system 108 may then cause a selected action to be executed upon a subsequent user selection conducted within the selector.

Figure 6:
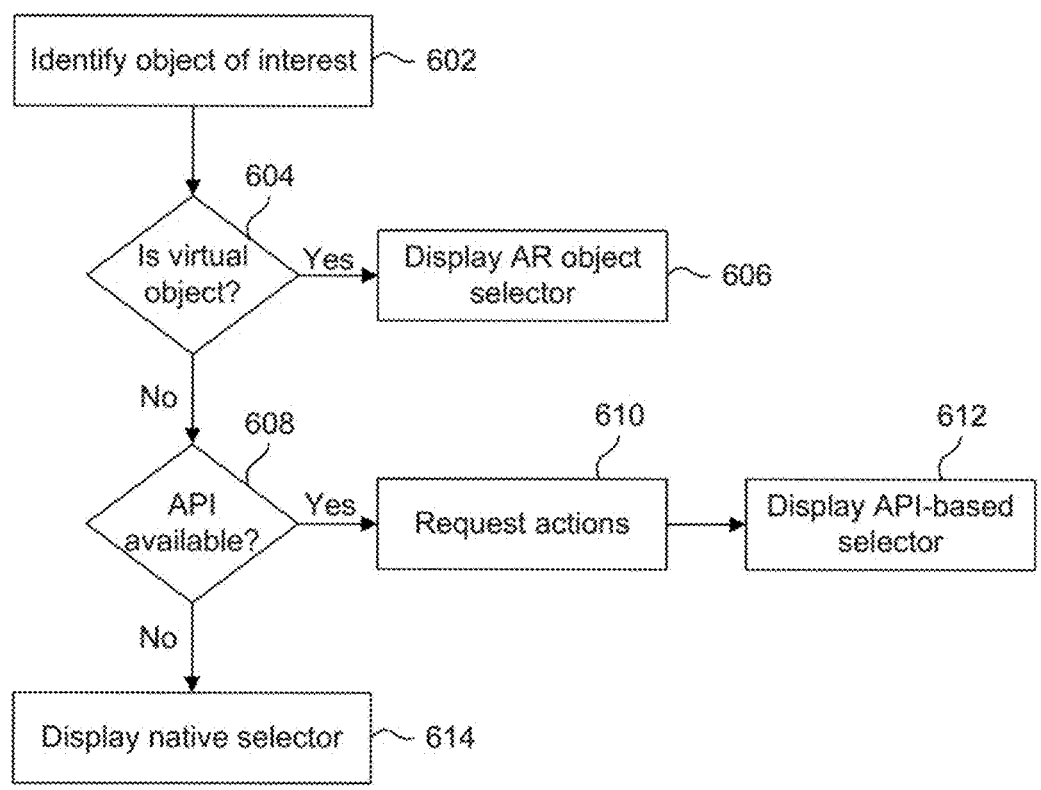
FIG. 6 is a flowchart illustrating a method of performing actions in an augmented reality environment, according to some embodiments.

FIG. 6 is a flowchart illustrating a method 600 of performing actions in an augmented reality environment, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, augmented reality system 108 may employ object determiner 206 to determine an object of interest examined by user 102. One skilled in the relevant art(s) will appreciate that in a given augmented reality space, many objects may exist, both real-world objects and virtual objects. In an embodiment, object determiner 206 may determine the object of interest, described above as objects 112, by the central position of the object in a screen display on mobile device 104. In another embodiment, object determiner 206 may determine the object of interest based on the object being in the center of viewing region in AR device 106. In addition to proximity to the center of the viewing region, object determiner 206 may analyze other factors to determine the object of interest. For example, augmented reality system 108 may store information about objects of interest interacted with in the past by a particular user among users 102. An object of interest that a user acted upon previously may be determined by object determiner 206 to be the object of interest in a field of vision. For another example, object determiner 206 may store a priority of objects based on, for example, the type of object viewed, and object types with a higher priority may be more likely to be selected by object determiner 206 as the object of interest. In one embodiment, augmented reality system 108 may also receive a user input in response to a first determined object of interest that indicates that the user wishes to interact with a second determined object of interest instead of the first determined object of interest. In another embodiment, augmented reality system 108 may receive another user input that indicates that the system should determine a second object of interest in addition to the first determined object of interest. In these instances, augmented reality system 108 may determine more than one object of interest within an augmented reality space generated by augmented reality system 108.

In 604, augmented reality system 108 determines if the object is a virtual object. If the object is virtual, then method 600 proceeds to 606, if method 600 is not virtual, then method 600 proceeds to 606.

In 606, augmented reality system 108 may employ presentation components 202 to display an augmented reality object selector. Such a selector may be tailored to the particular virtual object of interest being examined. The selector may include actions that modify, delete, examine, etc. the virtual object within the augmented reality space. For example, if the object of interest is an editable document rendered by augmented reality system 108 in an augmented reality space, a selector may be displayed that allows users 102 to modify the document, navigate the document, etc. For another example, if the virtual object of interest is a multimedia file, then options may be provided to users 102 to play the multimedia file, control the volume, etc. Because the virtual object is presented by augmented reality system 108, augmented reality system 108 may store information about the objects, e.g., in storage 212, and generate appropriate options and actions based on stored information. Moreover, augmented reality system 108 may process a subsequently selected action by appropriately modifying or otherwise changing the virtual object and the surrounding augmented reality space.

In 608, augmented reality system 108 determines if an API is available for a real world object. If an API is available, then method 600 proceeds to 610. If method 600 is not a real-world object, then method 600 proceeds to 614.

In 610, augmented reality system 108 may employ action agent 210 to request the actions that are available, i.e., performable on the object of interest. In an embodiment, action agent 210 may form an appropriate API call that queries the capabilities that are available on an identified object of interest. Action agent 210 may receive in return a list of capabilities or other suitable data structure indicating actions that may be performed by the object of interest. For example, augmented reality system 108 may query a speaker with a request for the capabilities that are performable on the speaker. The speaker may return a response that indicates that the speaker may receive a request to raise or lower volume. The response may further specify required parameters and other metadata describing how to complete such a request.

In 612, augmented reality system 108 may display a selector that includes the options received in 610. The selector may vary based on the features and function provided by the object of interest. Augmented reality system 108 may employ presentation components 202 to tailor the selector to the particular object. For example, if the object is a speaker, the presented selector may differ from the selector presented to control a robot arm.

In 614, augmented reality system 108 may display a native selector. The native selector may display options and actions that are available on mobile device 104 and/or on AR device 106. Augmented reality system 108 may tailor these options based on the type of the object of interest. For example, if the object is a simple object such as a pen, no additional functionality is available to conduct via the pen. Thus, users 102 may be provided with capabilities provided by mobile device 104 and/or AR device 106, e.g., users 102 may be able to load an e-commerce site to purchase more pens. However, if the real-world object is a document, users 102 may be presented with an option to digitize the object by capturing it in a photograph and then display the real-world object as a virtual object.

In this fashion, a variety of selectors may be provided to users in a reachable location. The selectors may vary based on whether the object of interest is a real-world object or a virtual object inserted by augmented reality system 108 into the augmented reality space. Moreover, real-world objects that provide additional functions may be addressed via a suitably formed API call, while users may receive a native object selector offering functionalities available on the mobile device for other real-world objects.

Figure 7:
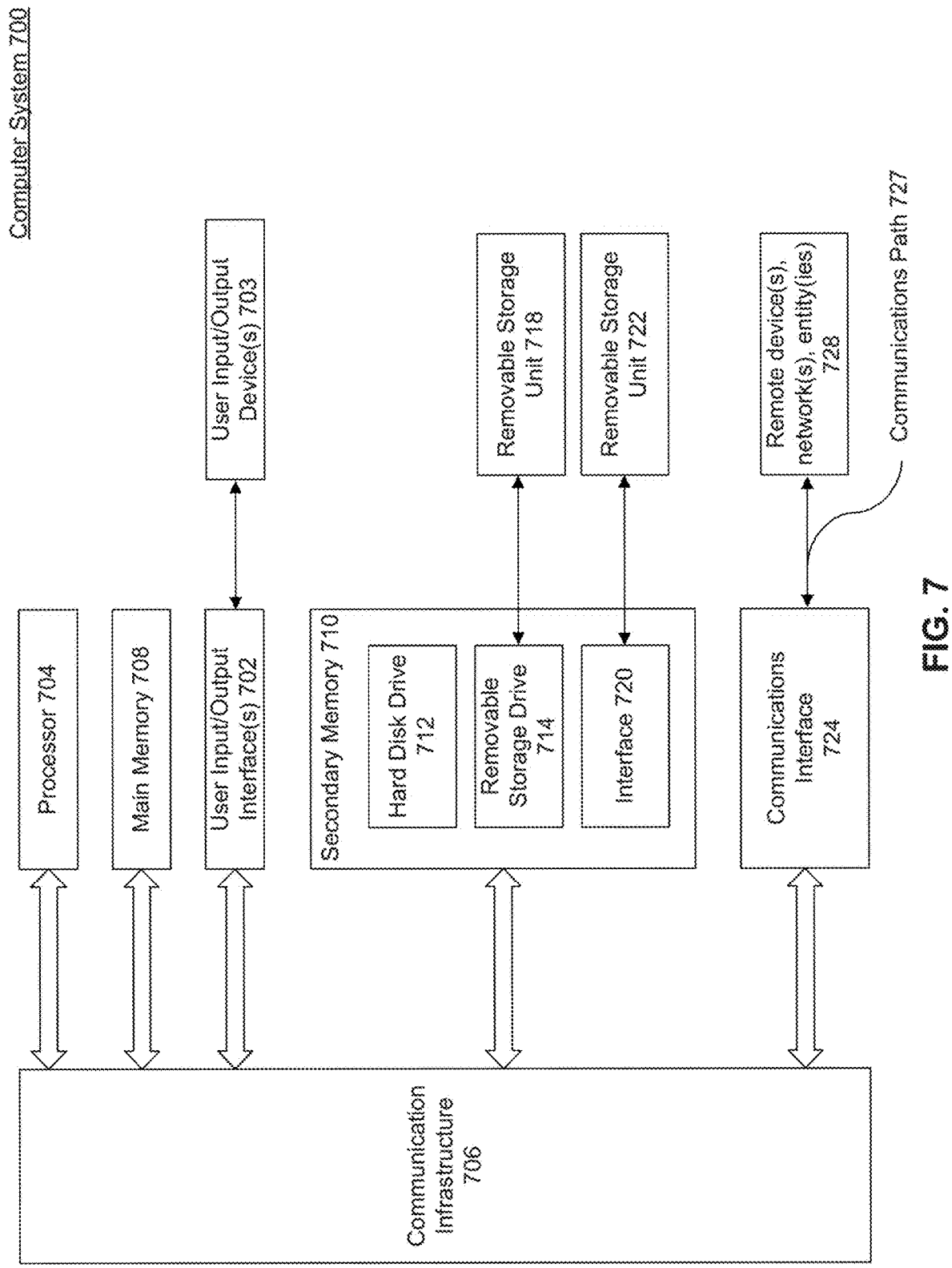
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
displaying, by one or more processors, an augmented reality experience to a user;
determining, by the one or more processors, an object of interest in the augmented reality experience;
calculating, by the one or more processors, a reachable area based on a screen length, a screen width, and dimensional settings stored in a user profile associated with the user, wherein the dimensional settings comprise an X dimension, a Y dimension, and a Z dimension, and wherein the X dimension, the Y dimension, and the Z dimension are percentages of the screen length and the screen width;
displaying, by the one or more processors, a line from the object of interest to the reachable area in the augmented reality experience; and displaying, by the one or more processors, a selector in the reachable area, wherein the selector displays one or more interaction options applicable to the object of interest, and wherein the selector receives a user input that indicates an action to perform from the one or more interaction options.

2. The method of claim 1, further comprising:
receiving, by the one or more processors, a request from the user to change the object of interest;
determining, by the one or more processors, a second object of interest in the augmented reality experience; and
displaying, by the one or more processors, a second selector in the reachable area, wherein the second selector displays second one or more interaction options applicable to the second object of interest, and wherein the second selector receives a user input that indicates a second action to perform from the second one or more interaction options.

3. The method of claim 1, further comprising:
determining, by the one or more processors, that the object of interest is a real-world object that provides an application program interface (API); and
sending, by the one or more processors, an API call to the API to cause the action to be performed by the real-world object.

4. The method of claim 1, further comprising:
causing, by the one or more processors, the action to be performed on a mobile device presenting the augmented reality experience, wherein the one or more interaction options are functions performable on the mobile device.

5. The method of claim 1, further comprising:
determining, by the one or more processors, a second object of interest in the augmented reality experience;
drawing, by the one or more processors, a line from the second object of interest to a second reachable area in the augmented reality experience; and
simultaneously displaying, by the one or more processors, with the selector, a second selector in the second reachable area, wherein the second selector displays a second one or more interaction options applicable to the second object of interest.

6. The method of claim 1, wherein the object of interest is a virtual object inserted into the augmented reality experience.

7. A system, comprising:
a memory; and
at least one processor coupled to the memory and configured to:
display an augmented reality experience to a user;
determine an object of interest in the augmented reality experience;
generate one or more interaction options applicable to the object of interest;
calculate a reachable area based on a screen length, a screen width, and dimensional settings stored in a user profile associated with the user, wherein the dimensional settings comprise an X dimension, a Y dimension, and a Z dimension, and wherein the X dimension, the Y dimension, and the Z dimension are percentages of the screen length and the screen width;
display a line from the object of interest to the reachable area in the augmented reality experience; and
display an augmented reality selector in the reachable area, wherein the augmented reality selector displays the one or more interaction options, wherein the augmented reality selector receives a user input that indicates an action to perform from the one or more interaction options.

8. The system of claim 7, the at least one processor further configured to:
receive a request from the user to change the object of interest;
determine a second object of interest in the augmented reality experience; and
display a second selector in the reachable area, wherein the second selector displays second one or more interaction options applicable to the second object of interest, and wherein the second selector receives a user input that indicates a second action to perform from the second one or more interaction options.

9. The system of claim 7, the at least one processor further configured to:
determine that the object of interest is a real-world object that provides an application program interface (API); and
send an API call to the API to cause the action to be performed by the real-world object.

10. The system of claim 7, the at least one processor further configured to:
cause the action to be performed on a mobile device presenting the augmented reality experience, wherein the one or more interaction options are functions performable on the mobile device.

11. The system of claim 7, the at least one processor further configured to:
determine a second object of interest in the augmented reality experience;
draw a second line from the second object of interest to a second reachable area in the augmented reality experience; and
simultaneously display with the selector, a second selector in the second reachable area, wherein the second selector displays a second one or more interaction options applicable to the second object of interest.

12. The system of claim 7, wherein the object of interest is a virtual object inserted into the augmented reality experience.

13. A non-transitory computer-readable device having instructions stored thereon that, when executed by at least one computing device, cause the at least one computing device to perform operations comprising:
displaying an augmented reality experience to a user;
determining an object of interest in the augmented reality experience;
calculating a reachable area based on a screen length, a screen width, and dimensional settings stored in a user profile associated with the user, wherein the dimensional settings comprise an X dimension, a Y dimension, and a Z dimension, and wherein the X dimension, the Y dimension, and the Z dimension are percentages of the screen length and the screen width;
displaying a line from the object of interest to a reachable area in the augmented reality experience;
displaying a selector in the reachable area, wherein the selector displays one or more interaction options applicable to the object of interest, and wherein the selector receives a user input that indicates an action to perform from the one or more interaction options.

14. The non-transitory computer-readable device of claim 13, the operations further comprising:

receiving a request from the user to change the object of interest;

determining a second object of interest in the augmented reality experience; and displaying a second selector in the reachable area, wherein the second selector displays second one or more interaction options applicable to the second object of interest, and wherein the second selector receives a user input that indicates a second action to perform from the second one or more interaction options.

15. The non-transitory computer-readable device of claim 13, the operations further comprising:

causing the second action to be performed on a mobile device presenting the augmented reality experience, wherein the one or more interaction options are functions performable on the mobile device.

16. The non-transitory computer-readable device of claim 13, the operations further comprising:

determining a second object of interest in the augmented reality experience;

drawing a second line from the second object of interest to a second reachable area in the augmented reality experience; and simultaneously displaying with the selector, a second selector in the second reachable area, wherein the second selector displays a second one or more interaction options applicable to the second object of interest.

17. The non-transitory computer-readable device of claim 13, wherein the second object of interest is a virtual object inserted into the augmented reality experience.

18. The non-transitory computer-readable device of claim 13, the operations further comprising:

determining that the object of interest is a real-world object that provides an application program interface (API); and sending an API call to the API to cause the action to be performed by the real-world object.

* * * * *